United States Patent Office 2,971,020
Patented Feb. 7, 1961

2,971,020
AMINO-THIOPHOSPHORIC ACID ESTERS AND A PROCESS FOR THEIR PRODUCTION
Gerhard Schrader, Wuppertal-Cronenberg, Germany, assignor to Farbenfabriken Bayer Aktiengesellschaft, Leverkusen, Germany, a corporation of Germany
No Drawing. Filed July 31, 1959, Ser. No. 830,740
Claims priority, application Germany Aug. 20, 1958
6 Claims. (Cl. 260—461)

The present invention relates to and has as its objects new and useful insecticidal amino-phosphoric acid esters and a process for their production. Generally these compounds may be represented by the following formula

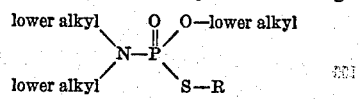

in which R stands for phenyl-lower alkyl, cyano-lower alkyl, dialkyl-amino-lower alkyl, or lower carbo-alkoxy-carbonyl-lower alkyl.

It is already known to produce certain amino-phosphoric acid-O-alkyl-S-alkylmercapto-alkyl esters by reacting corresponding amino-phosphoric acid ester chlorides with alkyl-mercapto-alkylmercaptans. This reaction and a number of compounds of this kind are described in United States Patent No. 2,881,201.

Lower dialkyl-amino-phosphoric acid-O-alkyl-S-alkyl esters in which the S-alkyl-group is substituted as shown above are not yet known from the literature. These new compounds are found to be insecticidal compounds with outstanding properties.

A very economic process has also been found for obtaining these amino-phosphoric acid-O-alkyl-S-alkyl esters. This process consists, starting from amino-thionophosphoric acid dichlorides which are obtainable from phosphorus sulfo-chloride, in that these are reacted with alcoholates and the chlorine in the amino-thionophosphoric acid chlorides obtained is hydrolized with alkali in aqueous alcoholic solutions. The corresponding free thiolic acids (or their salts) result in outstanding yield, and they can be alkylated in known manner with suitable alkali metal chlorides. The above sequence of reactions is illustrated by way of example by the production of the dimethyl-amino-thiolphosphoric acid-O-ethyl ester potassium salt:

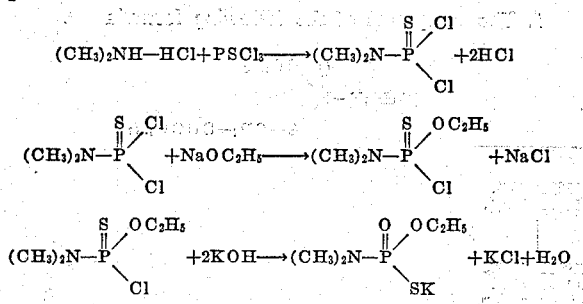

The last mentioned salt or corresponding compounds thereto may be reacted as described above with suitably substituted alkyl halides to yield the inventive compounds.

The new di-(lower-alkyl)-amino-thiolphosphoric acid esters described in this invention are distinguished by a good insecticidal action. The application of the compounds takes place in a manner known in principle preferably by mixing the resulting active substances with a dissolving assistant such as e.g. acetone or dimethyl formamide and further mixing with a commercially usual emulsifier preferably of a non-ionic-type based on an aryl hydroxy polyglycol ether. The preliminary mixture is then diluted with water to the desired active concentration. Application is however likewise often desirable in powder form whereby the compounds according to the present invention are mixed with suitable solid extenders.

The following examples give a summary of the new process and the new compounds.

Example 1

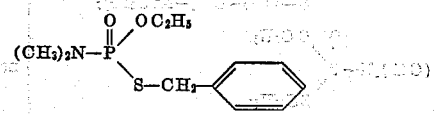

48 grams (0.25 mol) of dimethylamino-thionophosphoric acid-ethyl-ester chloride (B.P. at 60° C./1 mm. Hg) are dissolved in 130 ml. of anhydrous alcohol. 30 ml. of water are added thereto and subsequently a solution of 29 grams of potassium hydroxide in 60 ml. of water. This is heated to 60–70° C. for 2 further hours and 33 grams (0.25 mol) of benzyl chloride are added with stirring. The reaction product is held with stirring at 70° C. for a further two hours. Sodium chloride separates. The reaction product is then diluted with 300 ml. of benzene and these shaken out in a separating funnel with 100 ml. of water. After separation and drying the benzene solution with sodium sulfate the filtrate is fractionated. 32 grams of the new ester are obtained as a colorless water-insoluble oil of B.P. 89° C./0.01 mm. Hg. Yield 50% of the theoretical. On rats per os the product possesses a medium toxicity of 100 mg./kg.

Spider mites are killed to the extent of 100% with 0.1% solutions. At 0.01% concentrations the ester shows 100% systemic action against aphids.

Example 2

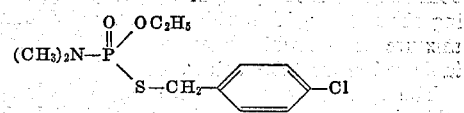

48 grams (0.25 mol) of dimethylamino-thionophosphoric acid-ethyl ester chloride are dissolved as in Example 1 in 130 ml. of alcohol and 30 ml. of water. Hydrolysis is then carried out with 29 grams of potassium hydroxide in 60 ml. of water. To the resulting solution 43 grams (0.25 mol) of p-chloro-benzyl chloride are added with stirring at 60° C. The temperature is held at 70° C. for a further 2 hours and working up follows as in Example 1. 45 grams of the new ester are obtained as a weakly yellow water-insoluble oil. Yield 61% of the theoretical. The compound may not be distilled without decomposition even in high vacuum.

Example 3

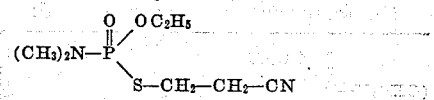

48 grams (0.25 mol) of dimethylamino-thionophosphoric ethyl ester chloride are dissolved in 130 ml. of anhydrous alcohol. 30 ml. of water are added and hydrolysis is carried out subsequently at 60° C. with a solution of 29 grams of potassium hydroxide in 60 ml. of water. To the resulting solution 35 grams (0.25 mol) of β-chloro-propionitrile is added with stirring. Heating is continued at 70° C. for a further 2 hours and working up is carried out in the usual way. 20 grams of the new ester are obtained as a weakly yellow insoluble oil of boiling point 85° C./0.01 mm. Hg. Yield 36% of the theoretical.

Rats per os LD$_{95}$ 25 mg./kg. Aphids and spider mites are killed to the extent of 100% with 0.1% solution. The preparation has outstanding ovicidal action on the eggs of the red spider.

In a corresponding manner the following compounds are produced:

| Compound | B.P. | yield, percent | rats per os medium toxicity, mg./kg. |
|---|---|---|---|
| (CH₃)₂N—P(=O)(OC₂H₅)(S—CH₂—CH₂—N(C₂H₅)₂) | 0.01 mm./75° | 15 | 2.5 |
| (CH₃)₂N—P(=O)(OC₂H₅)(SC₁₂H₂₅) | not dist. | 71 | 1,000 |
| (CH₃)₂N—P(=O)(OC₂H₅)(S—CH₂—COOC₂H₅) | 0.01 mm./73° | 60 | 500 |
| (CH₃)₂N—P(=O)(OC₂H₅)(S—CH(CH₃)—COOC₂H₅) | 0.01 mm./74° | 57 | 100 |
| (CH₃)₂N—P(=O)(OC₂H₅)(SC₆H₁₃) | 0.01 mm./68° | 62 | 250 |

To determine the special utility the compounds shown in the table below were tested as to the activity against aphids and spider mites. Aqueous solutions of these compounds have been prepared by mixing the active ingredient with the same amount of dimethyl formamide as an auxiliary solvent adding thereto 20% by weight referred to active ingredient of a commercial emulsifier consisting of a benzyl hydroxy polyglycol ether containing about 10 to 15 glycol residues, and diluting this pre-mixture at last with water to the desired concentration indicated in the table below.

The aphid tests were carried out in the known manner with the species Aphis fabae on Vitia faba by spraying the infested plants with the active emulsion until drip wet with evaluation after 2 or 4 days by counting the dead pests either on the surface of the soil or still remaining on the plants.

The spider mite tests were carried out in the known manner with the species Tetranychus altae Hanst. on Phaseolus vulgaris by spraying the infested plants with the active emulsion until drip wet with evaluation after 24 hours, 48 hours and 8 days.

The determination of the systemic action against aphids was likewise carried out with Aphis fabae on Vitia faba, whereby the active emulsion was poured onto plants which had been planted in flower pots.

The following results were obtained:

| | | |
|---|---|---|
| (CH₃)₂N—P(=O)(OC₂H₅)(S—CH₂—CH₂—N(C₂H₅)₂) | aphids | 0.01%— 90%. |
| | systemic action on aphids. | 0.1%— 100%. |
| (CH₃)₂N—P(=O)(OC₂H₅)(S—CH₂—CH₂—CN) | aphids | 0.1%— 100%. |
| | spider mites | 0.01%— 50%. |
| | spider mites | ovicidal action. |
| | systemic action on aphids. | 0.1%— 100%. |

I claim:
1. Amino-thiolphosphoric acid esters of the following formula

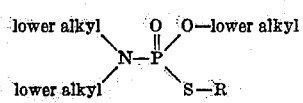

in which R stands for a member selected from the group consisting of phenyl-lower alkyl, cyano-lower alkyl, dialkyl-amino-lower alkyl and lower carbo-alkoxy-carbonyl-lower alkyl, and wherein lower alkyl stands for an alkyl radical up to 4 carbon atoms.

2. The compound of the following formula

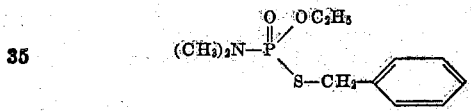

3. The compound of the following formula

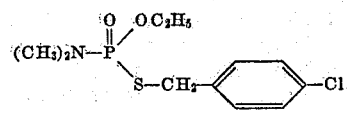

4. The compound of the following formula

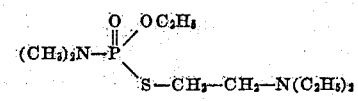

5. The compound of the following formula

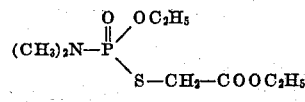

6. The compound of the following formula

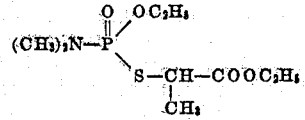

References Cited in the file of this patent
UNITED STATES PATENTS
2,881,201    Schrader _____ Apr. 7, 1959